Patented May 12, 1942

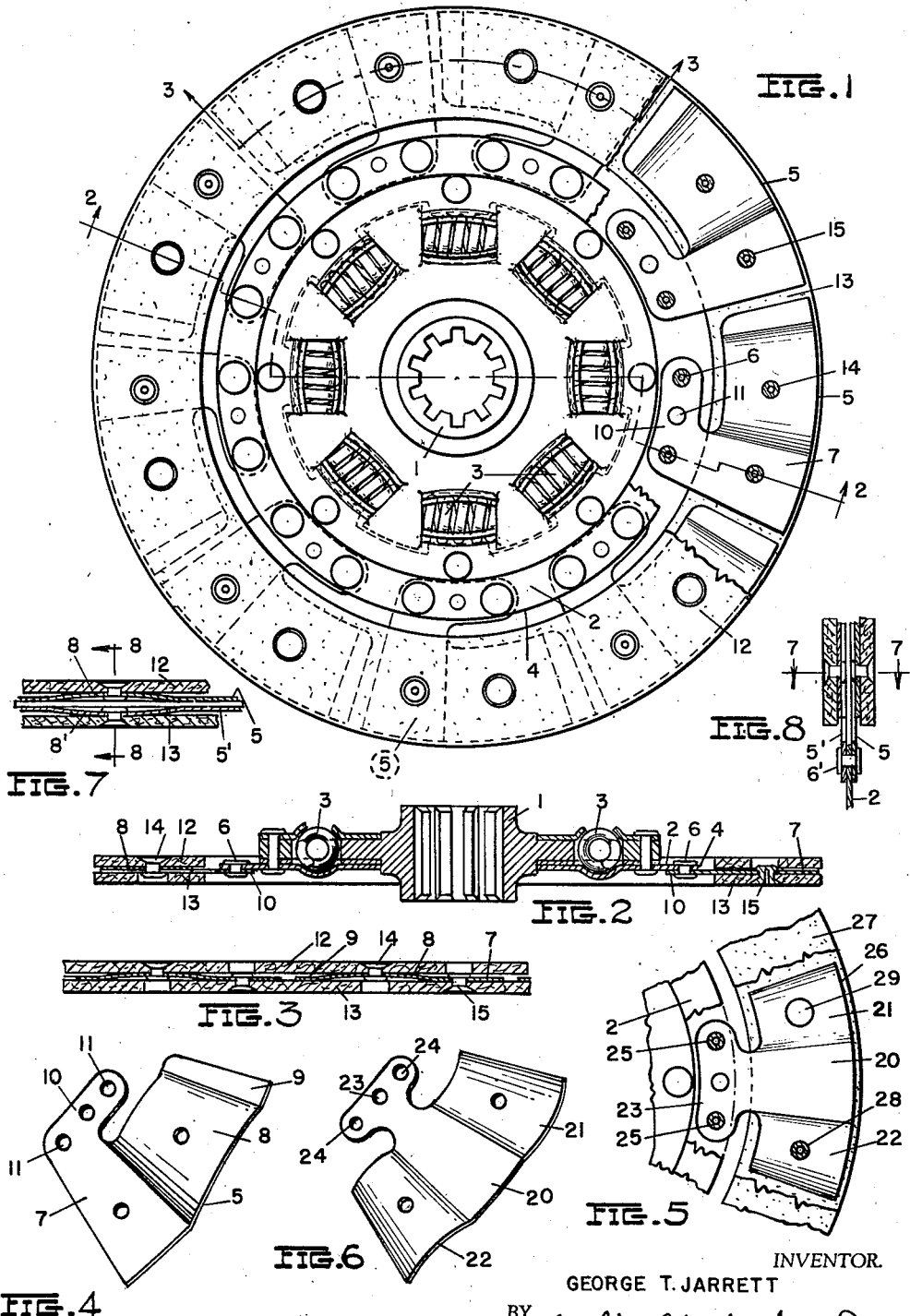

2,282,981

UNITED STATES PATENT OFFICE 2,282,981

CLUTCH PLATE

George T. Jarrett, East Cleveland, Ohio, assignor, by mesne assignments, to Automotive Devices Company, Cleveland, Ohio, a partnership composed of Irwin Bramson, Philip Saks, Ira Saks and Morris Saks Application February 10, 1940, Serial No. 318,304

4 Claims. (Cl. 192—107)

The present invention relates to a new and improved construction of a clutch plate which is the driven member of an automotive clutch assembly, adapted to be engaged between two driving members, usually the fly-wheel and the pressure plate. Desirable criteria in the design of such clutch plates consist primarily in providing a cushioning effect for the friction facing rings which are frictionally engaged by the driving elements of the clutch, in reducing the "spinning weight," or proportionate weight, of the clutch plate located at points removed from its center, in minimizing the effect of heat of friction upon the clutch plate, and finally, in reducing the cost of manufacture of the plate.

Heretofore, the provision of the cushioning effect, or cushions, for supporting the friction facing rings of the plate has been accomplished generally in either one of two ways, first, by distortion of segmental portions of the body of the metallic disk forming the clutch plate proper, and secondly, by the insertion of separate elements between the body of the disk and the friction facings in the form of tongues, leaf-springs and the like. The first of these expedients possesses a disadvantage, in that the material of the deformed or distorted cushion portions of the clutch disk must necessarily be the same as that of the body of the disk, since they are formed as an integral part thereof, and, therefore, cannot possess substantially different heat-resistant and flexing properties than the body of the disk. Maintenance of proper alignment in the body of the disk during the operation of deforming or distorting the segmental cushion portions constitutes an additional difficulty. The second expedient, above indicated, possesses a disadvantage, in that the addition of separate spring elements overlying and around the peripheral portion of the disk body increases the spinning weight of the clutch plate. The clutch plate construction embodying the principle of my present invention eliminates the foregoing difficulties. Briefly outlined, my clutch plate comprises a disk body portion whose outer periphery terminates short of the friction facing rings and which is fabricated from a material which readily lends itself to a stamping or pressing process, such as a low carbon steel; together with flexible, segment-shaped cushion members which are in the form of separate pieces attached to the outer periphery of the disk body and underlying and supporting the friction facing rings. These separate cushion segments are fabricated from a metal having greater properties of tensile strength and flexibility than that of the disk body, so that they can be separately formed and heat-treated before attachment to the disk. Furthermore, these separate cushion segments, having improved properties of flexibility and strength with respect to the disk body can accordingly be made of thinner cross-section, and, hence, less weight, thus reducing the resultant spinning weight of the clutch plate as a whole.

Additional objects and advantages of my invention comprise the minimization of the distortion or dishing effect of the clutch plate as a whole, due to alternate expansion and contraction from changes in temperature; elimination of fatigue failure cracks in the body of the disk which originate at points of maximum bending or flexing in the cushion segments; and an improvement in the radial distribution or counterbalance of the component parts of the clutch plate.

To the accomplishment of the foregoing and related ends, said invention, then, consists of the means hereinafter fully described and particularly pointed out in the claims. The annexed drawing and the following description set forth in detail certain structure embodying the invention, such disclosed means constituting, however, but one of various structural forms in which the principle of the invention may be used.

In said annexed drawing:

Fig. 1 is a plan view of a clutch plate embodying the construction of my invention, and wherein a portion of one of the friction facing rings of the disk body has been broken away; Fig. 2 is a transverse, sectional view taken substantially along line 2—2 of Fig. 1; Fig. 3 is an arcuate, sectional view taken substantially along line 3—3 of Fig. 1; Fig. 4 is a perspective view of one of the separate cushion segments; Fig. 5 is a fragmentary, partially broken away plan view illustrating a modified form of construction; Fig. 6 is a perspective view of the form of cushion segment utilized in the construction of Fig. 5; Fig. 7 is a detail, sectional view taken through the friction facing rings and cushion segments, illustrating another form of construction wherein two opposed cushion segments are employed, such sectional view being taken substantially along line 7—7 of Fig. 8; and Fig. 8 is a sectional view taken substantially along line 8—8 of Fig. 7.

Now referring more particularly to the drawing, the clutch plate shown therein comprises the central, splined hub 1 carrying the disk body 2. Coil cushion springs 3 are mounted between the disk body 2 and the flange of the hub 1 in the customary manner, in order to provide a yieldable transmission of torque or forces between the hub 1 and disk body 2.

The outer circumstance of the disk body 2 terminates at the point 4. Separate cushion segments 5 are attached to the outer peripheral portion of the disk body 2 by means of the rivets 6.

The cushion segments 5 comprise a flat portion 7 and an arcuately extending wing portion consisting of the laterally off-set or bowed portion 8 and the terminal, flat end portion 9. The segments 5 have an inner wing portion or tab 10, in which the rivet holes 11 are located, which is also of substantially arcuate extent, but to a less degree than that of the portions 8 and 9.

As is shown in Fig. 1, only two rivets 6 are employed to attach the wing portion 10 to the disk body 2, leaving one of the rivet holes 11 unoccupied. This latter rivet hole 11 may be placed in registry with a corresponding hole in the disk body 2. This additional rivet hole may optionally be used for the insertion of an additional rivet so that there will be three, instead of two, rivets per segment, if additional strength is needed; alternatively, a balance weight may be inserted in this hole for the purpose of correcting or finally adjusting the balance of the clutch plate unit as a whole.

Friction facing rings 12 and 13 are mounted on opposite sides of the cushion segments 5. Thus, the facing ring 12 is attached to the bowed portions 8 by means of the rivets 14 passing through the intermediate or furthest off-set point of such bowed portion; and the friction facing ring 13 is fastened to the flat portion 7 of the cushion segments 5 by means of the rivets 15.

In the alternative form of construction shown in Figs. 5 and 6, the separate cushion segments have wing portions extending in both, rather than in only one arcuate direction. These segments thus comprise a central flat portion 20 adjoined by the arcuately extending wing portions 21 and 22 which are laterally off-set or bowed in opposite directions. The inner wing portion 23, or attaching tab, also has arcuately extending portions and rivet holes 24. It is, of course, attached to the disk body 2 by means of the rivets 25. The friction facing rings 26 and 27 are attached to the oppositely bowed portions 21 and 22, respectively, by means of the rivets 28 and 29.

In the alternative form of construction shown in Figs. 7 and 8, two opposed cushion segments, such as 5 and 5', are employed instead of a single segment. Thus, the separate cushion segment 5' is attached to the opposite side of the disk body 2 from segment 5 and both of them are secured by the common rivet such as indicated at 6'. The friction facing rings 12 and 13 in this instance, are attached only to the bowed portions 8 and 8'.

It will be noted, from Fig. 2, for example, that the cross-sectional thickness of the cushion segments 5 is less than that of the disk body 2. This is made possible by reason of the fact that the segments 5 are not an integral part of the body 2 and, therefore, can be fabricated from a metal of different physical properties and resulting in a reduction of the proportionate amount of weight of the clutch plate in its outer zone, so that the spinning weight or rotating inertia of the latter is thereby substantially reduced. Furthermore, it will be noted, as by reference to Fig. 2, that the cushion segments 5 are mounted upon the opposite side of the disk body 2 to that of the other parts of the clutch plate such as the coil springs 3 and the housings therefor, thus effecting a counterbalancing off-set in the radial plane of the clutch plate, so that a more correct radial balance and distribution of the weight of the latter is permitted.

A common source of failure of clutch plates during service is to be found in the formation of fatigue failure cracks which usually originate at points of maximum bending stress in the metal of the plate. Thus, the logical point for the initiation of such fatigue failure cracks in the present construction would be at the reduced "neck" portion between the inner and outer wing portions of the segments. But the cracks thus initiated cannot extend into the disk body 2, because the segments are separate and individual therefrom.

Other modes of applying the principle of my invention may be employed instead of the one explained, change being made as regards the structure herein disclosed, provided the means stated by any of the following claims or the equivalent of such stated means be employed.

I, therefore, particularly point out and distinctly claim as my invention:

1. A clutch plate comprising a disk body, a plurality of flexible cushion members in the form of individually separate pieces having flat portions and arcuately extending wing portions, said cushion members being attached to opposite sides of the outer periphery of said disk body and extending beyond the outer circumference thereof, each of said flat portions being normally axially spaced from the opposed cushion member a distance equal to the thickness of said disk body, said wing portions being laterally and oppositely off-set from the plane of said disk body, and friction facing rings attached to said cushion members, whereby on compression of said facing rings toward each other both said flat portions and said wing portions are subjected to flexing action.

2. A clutch plate comprising a disk body, a plurality of flexible cushion members in the form of individually separate pieces having flat portions and arcuately extending wing portions, said cushion members being attached to opposite sides of the outer periphery of said disk body and extending beyond the outer circumference thereof, said flat portions being normally axially spaced opposite each other the thickness of said disk body, said wing portions being laterally and oppositely off-set from the plane of said disk body, and friction facing rings attached to said off-set wing portions, whereby on compression of said facing rings toward each other both said flat portions and said wing portions are subjected to flexing action.

3. A clutch plate comprising a disk body, a plurality of flexible cushion members in the form of individually separate pieces having flat portions and arcuately extending wing portions, said cushion members being attached to opposite sides of the outer periphery of said disk body and normally axially spaced from each other at all points and extending beyond the outer circumference thereof, said wing portions being laterally and oppositely off-set from the plane of said disk body, and friction facing rings attached to said cushion members, whereby on compression of said facing rings toward each other both said flat portions and said wing portions are subjected to flexing action.

4. A clutch plate comprising a disk body, a plurality of flexible cushion members in the form of individually separate pieces having flat portions and arcuately extending wing portions, said cushion members being attached to opposite sides of the outer periphery of said disk body and normally axially spaced from each other at all points and extending beyond the outer circumference thereof, said flat portions in each opposed cushion member being axially aligned and normally spaced apart the thickness of said disk body, said wing portions being laterally and oppositely off-set from the plane of said disk body, and friction facing rings attached to said off-set wing portions, whereby on compression of said facing rings toward each other both said flat portions and said wing portions are subjected to flexing action.

GEORGE T. JARRETT.